(12) United States Patent
Carr

(10) Patent No.: US 7,458,462 B2
(45) Date of Patent: Dec. 2, 2008

(54) DIE STORING AND ORGANIZING SYSTEM

(75) Inventor: Robert Carr, Vancouver, WA (US)

(73) Assignee: FCI Americas Technology, Inc., Carson City, NV (US)

( * ) Notice: Subject to any disclaimer, the term of this patent is extended or adjusted under 35 U.S.C. 154(b) by 622 days.

(21) Appl. No.: 10/771,939

(22) Filed: Feb. 4, 2004

(65) Prior Publication Data

US 2004/0195748 A1    Oct. 7, 2004

Related U.S. Application Data

(60) Provisional application No. 60/453,783, filed on Mar. 11, 2003.

(51) Int. Cl.
*B65D 85/24* (2006.01)
(52) U.S. Cl. .................. 206/346; 206/347; 206/343
(58) Field of Classification Search ......... 206/338–347, 206/349; 269/53, 900
See application file for complete search history.

(56) References Cited

U.S. PATENT DOCUMENTS

| | | | | |
|---|---|---|---|---|
| 2,367,253 | A * | 1/1945 | Williams | 211/105 |
| 3,019,520 | A * | 2/1962 | Woolley | 29/234 |
| 4,955,476 | A * | 9/1990 | Nakata et al. | 206/346 |
| 5,096,061 | A * | 3/1992 | Wakai | 206/347 |
| 5,385,183 | A * | 1/1995 | Ferranti | 144/144.51 |
| 5,499,724 | A * | 3/1996 | Hickman | 211/70.6 |
| 5,762,190 | A * | 6/1998 | Leistner | 206/347 |
| 5,927,517 | A * | 7/1999 | Lipman et al. | 211/59.1 |
| 6,227,030 | B1 | 5/2001 | Lefavour et al. | 72/416 |
| 6,640,968 | B2 * | 11/2003 | Selle | 206/303 |
| 6,688,208 | B2 * | 2/2004 | Campbell et al. | 83/743 |

* cited by examiner

*Primary Examiner*—Jila M Mohandesi
(74) *Attorney, Agent, or Firm*—Harrington & Smith, PC

(57) ABSTRACT

A die storing and organizing system includes a holder for storing and organizing crimp dies, the holder having a first side and a second, opposite side. The system further includes a plurality of apertures in the holder, each aperture extending from the first side to the second, opposite side; wherein each aperture is adapted to receive a die pin.

25 Claims, 4 Drawing Sheets

DIE STORING AND ORGANIZING SYSTEM

CROSS-REFERENCE TO RELATED APPLICATION

This application claims the benefit under 35 USC §119(e) of provisional patent application No. 60/453,783 filed Mar. 11, 2003, which is hereby incorporated by reference in its entirety.

BACKGROUND OF THE INVENTION

1. Field of the Invention

The present invention relates to a system for storing and organizing dies for crimping together electrical conductors.

2. Brief Description of Prior Developments

Crimping dies are employed in the process of crimping together electrical conductors. FCI USA, Inc. sells crimping dies, including those known as "W" type dies. The "W" type dies form a general circumferential crimp around a barrel section of an electrical connector. The "W" type dies are installed primarily in what is known as an industry "D" die retaining groove. The "D" groove is common in mechanical hand held crimping tools, such as the MD6 HYTOOL™. Other crimping dies, such as "X" type dies sold by FCI USA, Inc. may also be employed with some standard mechanical hand held crimping tools, including the MD7-34R POSI-PRESS HYTOOL™. U.S. Pat. No. 6,227,030, assigned to FCI, USA, Inc., describes further crimping dies, and the contents of this patent are hereby incorporated by reference. Accordingly, various dies may be used with hand held crimping tools to produce crimps across a wide range of conductor diameters. Advantageously, conductor size can be varied by varying crimp die size. Thus, operators of hand held crimping tools will often have a number of differently sized dies with them at a work site. Further, as some dies may wear out after extended usage, and it is not uncommon for one die of a pair of matching dies to be lost, the operators may also have a number of same sized dies with them at a work site.

In view of the large number of various dies an operator may have available at any one time, there is a desire for an efficient system for storing and organizing these dies. It would further be advantageous if such a device employed standard crimping parts to store and organize the dies, which would minimize the cost of the device.

SUMMARY OF THE INVENTION

In accordance with one aspect of the present invention, a die storing and organizing system is disclosed. The system comprises a holder for storing and organizing crimp dies, the holder having a first side and a second, opposite side. The system further comprises a plurality of apertures in the holder, each aperture extending from the first side to the second, opposite side; wherein each aperture is adapted to receive a die pin.

In accordance with another aspect of the present invention, a die storing and organizing system is disclosed. The system comprises a holder for storing and organizing crimp dies, the holder having a first side and a second, opposite side; and a plurality of apertures in the holder, each aperture extending from the first side to the second, opposite side; wherein each aperture is adapted to receive a die pin. The system further comprises at least one die pin received in at least one aperture, protruding outward from the first side and the second side; and at least one crimp die positioned on at least one die pin.

In accordance with a further embodiment of the present invention, a die storing and organizing system comprises a holder for storing and organizing crimp dies, the holder having a first side and a second, opposite side; and at least one die pin formed as an integral part of the holder, protruding outward from the first side and the second side. At least one die pin is adapted to receive a crimp die.

In accordance with one method of the present invention, a method for storing and organizing dies is disclosed. The method comprises providing a holder for storing and organizing crimp dies. The holder has a first side and a second, opposite side, and a plurality of apertures are located in the holder. Each aperture extends from the first side to the second, opposite side, and each aperture is adapted to receive a die pin. The method further comprises inserting a die pin through an aperture so that the die pin protrudes outward from the first side and the second side; and positioning a crimp die on the die pin.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
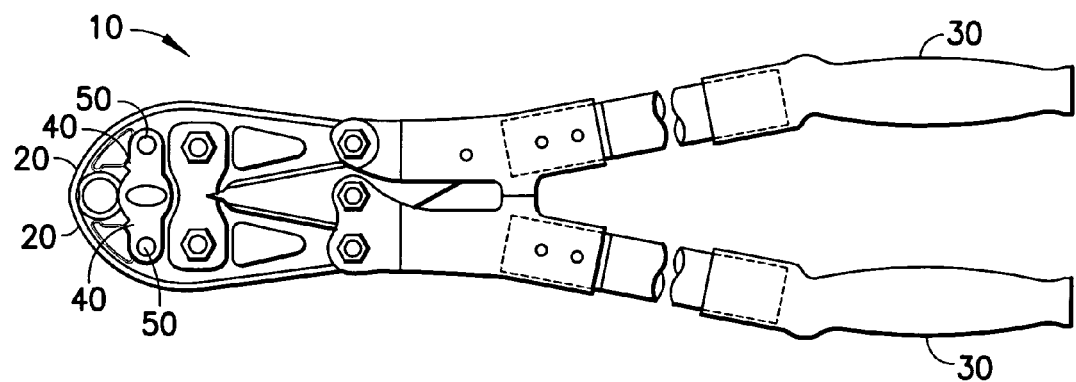
FIG. 1 is a schematic illustration of a prior art crimping tool.

Referring to FIG. 1, there is shown a schematic illustration of a hand held mechanical crimping tool 10. The tool 10 is a manual hand operated crimping tool useful for crimping connectors onto electrical conductors. However, in alternate embodiments, features of the present invention could be used with other types of tools. Thus, although the present invention will be described with reference to the embodiments shown in the drawings, which are meant to be merely illustrative and therefore not limiting, it should be understood that the present invention can be embodied in many alternate forms of embodiments. In addition, any suitable size, shape or type of elements or materials could be used.

The tool 10 shown in FIG. 1 generally comprises a pair of movable jaw members 20, which cooperate together in a crimping action upon actuation of a handle mechanism 30.

Figure 2:
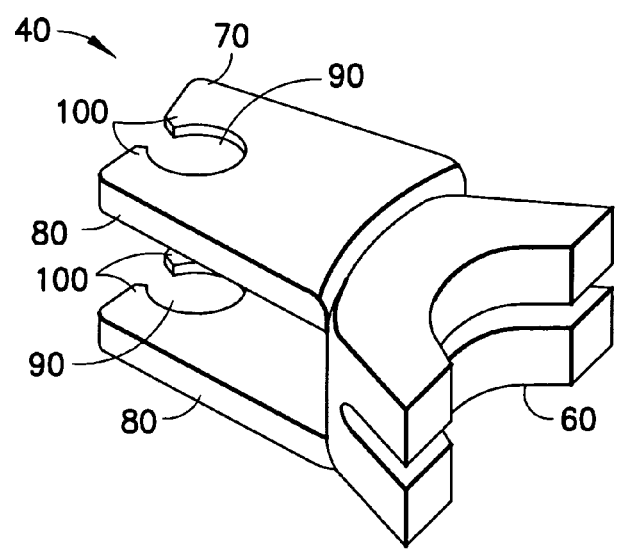
FIG. 2 is a perspective view of a "W" type die for use with an embodiment of the present invention.

Dies 40 may be retained in tool 10 by die pins 50. Dies 40 may comprise any suitable dies known in the art. Examples of suitable known dies include "W" type and "X" type dies sold by FCI, USA, Inc. A die 40 of the "X" type is shown in FIG. 2, which is meant to be merely illustrative of one type of die 40. The "X" type die shown in FIG. 2 generally includes a crimping portion 60 and a mounting portion 70. The mounting portion 70 includes two spaced-apart legs 80, each having a pin receiving portion 90 bound by inward snap projections 100 for retaining die pins 50 within pin receiving portions 90 during conventional tool usage.

Die 40 and die pin 50 may be made from any suitable rigid material, and in any suitable shape and size. For example, die 40 and die pin 50 may be made from a rigid thermoplastic material. Thus, during tool usage, die pins 50 may snap past snap projections 100 into pin receiving portions 90, whereby die 40 may be affixed to die pins 50 of tool 10.

Figure 3:
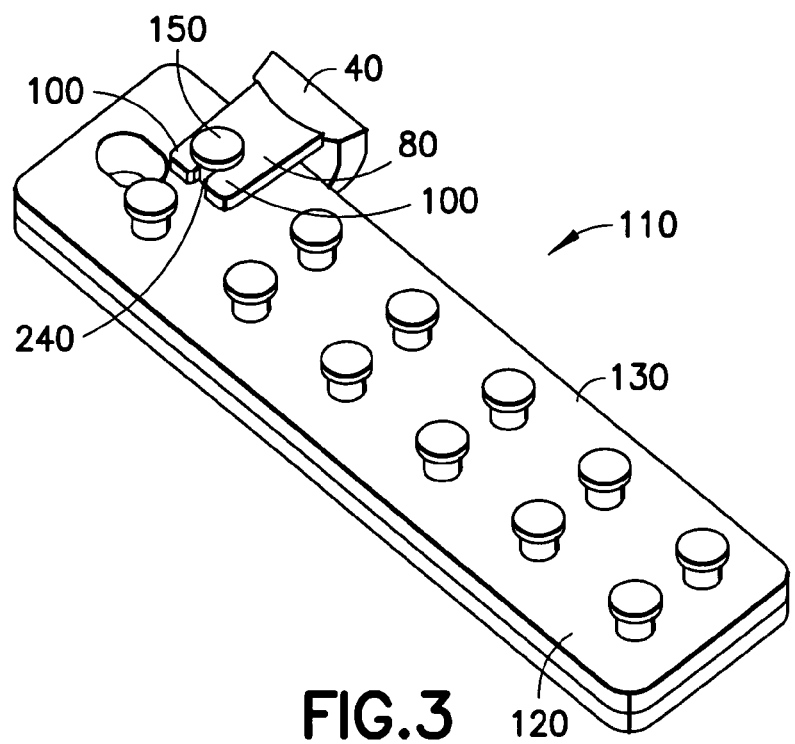
FIG. 3 is a top perspective view of a die storing and organizing system, according to an embodiment of the present invention.
Figure 4:
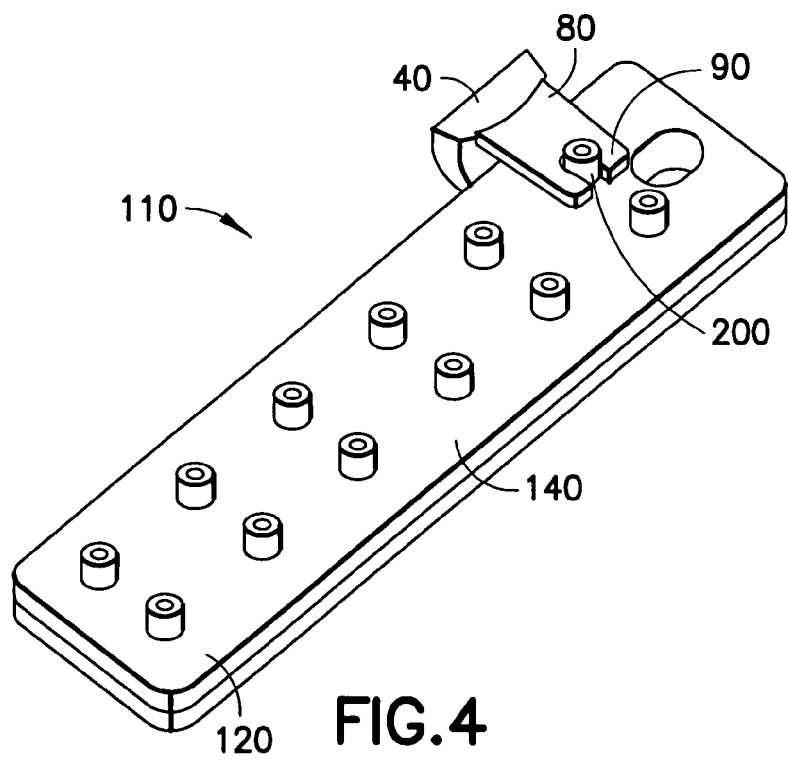
FIG. 4 is a bottom perspective view of die storing and organizing system of FIG. 3.

Die 40 may be positioned in die storing and organizing system 110, as shown in FIGS. 3-4. FIG. 3 and FIG. 4 show top and bottom perspective views of system 110, respectively, in accordance with an embodiment of the present invention. In the embodiment shown in these figures, system 110 generally includes a substantially flat, rectangular shaped holder 120 in the form of a plate having a first side 130 and a second side 140. The holder 120 includes a plurality of die holding pins 150, extending through the body of the holder 120 and located substantially parallel to one another. Die holding pins 150 protrude outward from the first side 130 and second side 140 of holder 120.

As shown in FIGS. 3 and 4, die 40 may be positioned on die holding pin 150. In particular, one of the legs 80 of mounting portion 70 of die 40 may be positioned on the first side 130 of holder 120, and the other of the legs 80 may be positioned on the second side 140 of the holder 120. Accordingly, the thickness of holder 120 may be less than the distance by which legs 80 are spaced apart, as shown in FIGS. 3-4.

Holder 120 and die holding pins 150 may be made from any suitable rigid material, such as a rigid thermoplastic or metallic material, and in any suitable shape and size. Die holding pins 150 may also be the same as or different than die pins 50. Advantageously, holder 120 may be suitable sized to fit within its own carrying case for ease of transport.

In alternate embodiments, the system 110 may comprise any suitable shape, such as square, circular, etc. Similarly, die holding pins 150 may be arranged in any suitable spaced-apart configuration on the holder 120.

Figure 5:
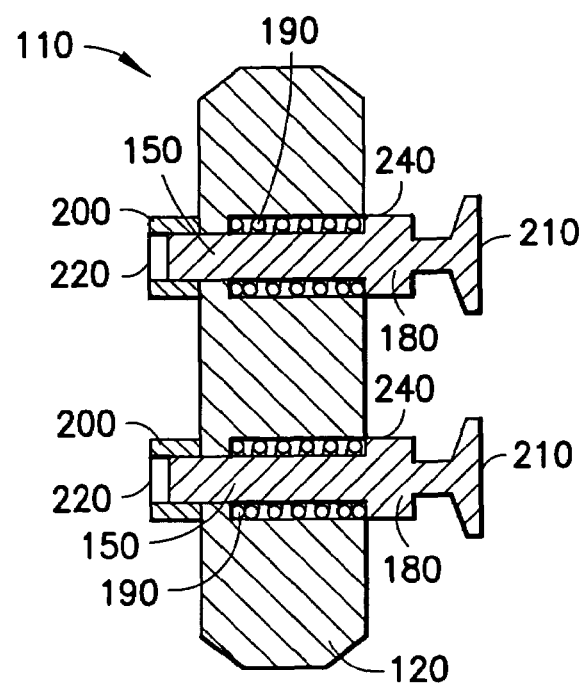
FIG. 5 is a sectional view of the die storing and organizing system of FIGS. 3-4.
Figure 7:
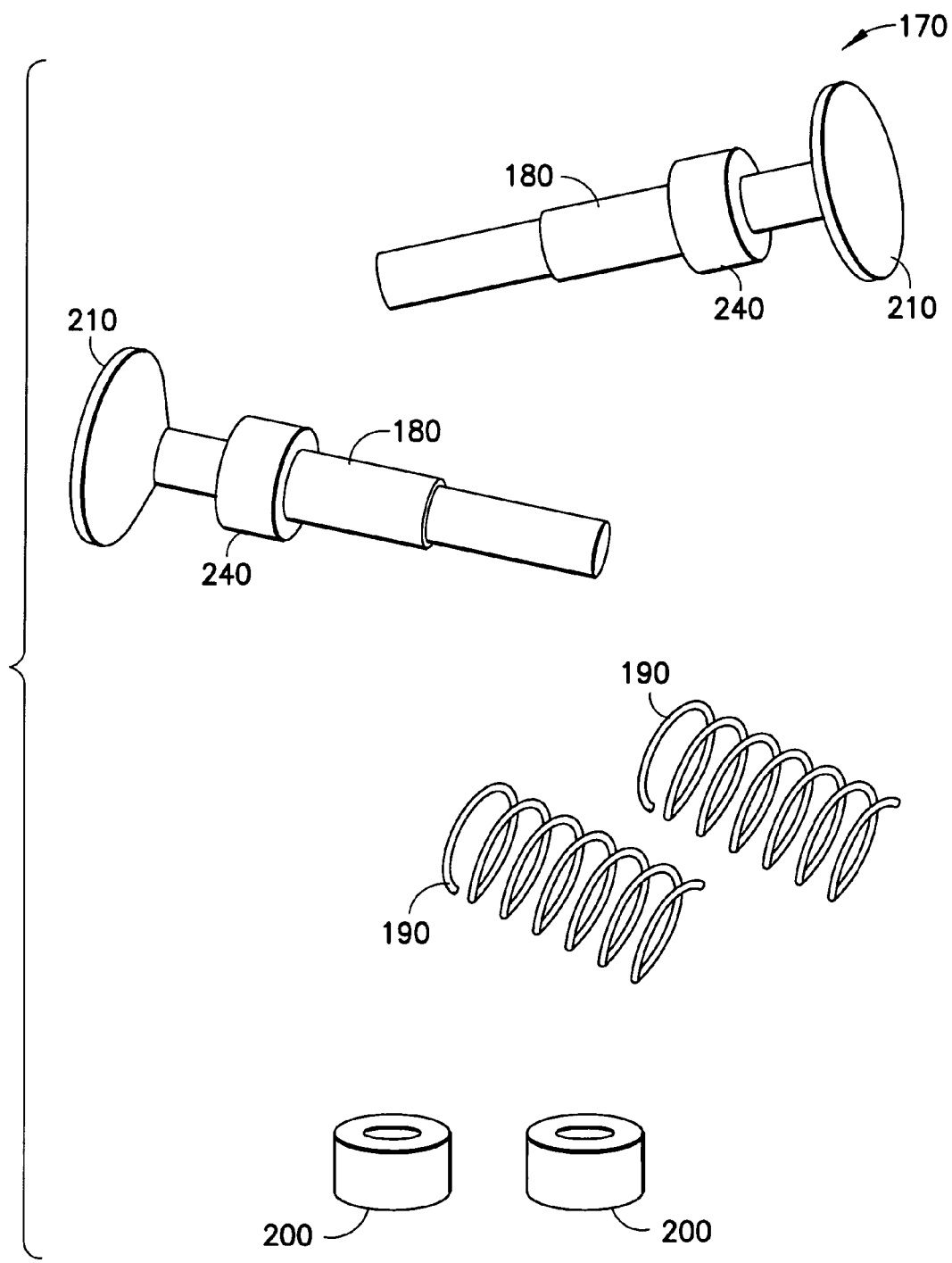
FIG. 7 is a perspective view of a die pin repair assembly for use with the system of FIGS. 3-5.

Referring to FIG. 5, there is shown a sectional view of die storing and organizing system 110 of FIGS. 3-4. As shown in FIGS. 5 and 7, die holding pins 150 may comprise standard die pin repair assembly 170 useful with hand held crimping tools, such as that of FIG. 1. As shown in FIG. 7, die pin repair assembly 170 may comprise die repair pin 180, compression spring 190 and end cap 200. The die pin repair assembly 170 may be positioned on holder 120, as shown in FIG. 5, wherein the head 210 of the die repair pin 180 protrudes from one side of the holder 120 and the end 220 of the die repair pin 180 protrudes from the opposite side of the holder 120.

As shown in FIGS. 5 and 7, die repair pin 180 may comprise a collar portion 240 around which the receiving portion 90 of one leg 80 of the mounting portion 70 of the die 40 can surround. The pin receiving portion 90 of the other leg 80 of the mounting portion 70 of the die 40 may surround the end cap 200. Thereby, die 40 and the die pin repair assembly 170 may be affixed to the holder 120.

Advantageously, standard spring loaded die repair assemblies 170 may be used to replace worn die pins 50 from crimping tools, such as tool 10 of FIG. 1.

Components of the die repair assembly 170 may be made from any suitable material in any suitable shape and size. One suitable die repair assembly is sold by FCI USA, Inc. as a die button repair kit (PT4931-1).

Figure 6:
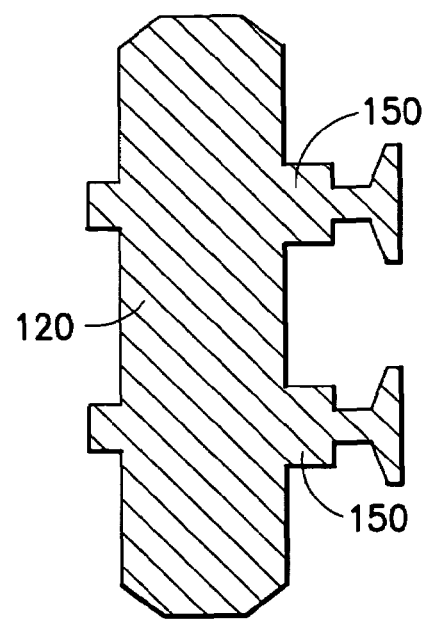
FIG. 6 is sectional view of a die storing and organizing system, according to another embodiment of the present invention.

In accordance with a further embodiment of the present invention, as shown in FIG. 6, die holding pins 150 may be formed or molded as an integral, unitary part of holder 120.

An advantage of embodiments of the present invention is a die storing and organizing system, which may employ standard crimping parts to store and organize the dies. This results in efficient storage of tooling parts and also reduces the cost of the die storing and organizing system.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A die storing and organizing system comprising:
   a holder for storing and organizing crimp dies, the holder having a first side and a second, opposite side, wherein the holder comprises a plurality of apertures, each aperture extending from the first side to the second, opposite side; and
   at least one crimp die pin received in at least one of the apertures, wherein the at least one crimp die pin protrudes outward from the first side and the second side, and wherein the crimp die pin is sized and shaped to have one of the crimp dies mounted thereon to thereby hold the crimp die on the holder, wherein the at least one crimp die pin is movably mounted to the holder and biased by a spring in a home position.

2. The System of claim 1, wherein the apertures are arranged parallel to each other in a spaced apart configuration.

3. The system of claim 1, comprising at least one crimp die positioned on the at least one die pin.

4. The system of claim 3, wherein the die includes a crimping portion and a mounting portion, wherein the mounting portion includes two spaced apart legs, each leg having a pin receiving portion bound by inward snap projections.

5. The system of claim 4, wherein one of the legs of the mounting portion is positioned on the first side of the holder, and the other of the legs is positioned on the second side of the holder.

6. The system of claim 5, wherein the at least one die pin comprises a die repair assembly, the die repair assembly including a die repair pin having a head portion and an end portion, a compression spring, and an end cap.

7. The system of claim 6, wherein the head portion of the die repair pin protrudes from one side of the holder and the end portion protrudes from the opposite side of the holder.

8. The System of claim 7, wherein the die repair pin further comprises a collar portion around which the receiving portion of one leg of the mounting portion of the die surrounds, and the pin receiving portion of the other leg surrounds the end cap, wherein the die repair assembly is affixed to the holder.

9. A die storing and organizing system comprising:
   a holder for storing and organizing crimp dies, the holder having a first side and a second, opposite sides
   a plurality of apertures in the holder, each aperture extending from the first side to the second, opposite side; wherein each aperture is adapted to receive a die pin;
   at least one die pin received in at least one aperture, protruding outward from the first side and the second side; and
   at least one crimp die positioned on at least one die pin.

10. The system of claim 9, wherein the holder is a substantially flat, elongated plate.

11. The system of claim 9, wherein the die includes a crimping portion and a mounting portion, wherein the mounting portion include two spaced apart legs, each leg having a pin receiving portion bound by inward snap projections.

12. The system of claim 11, wherein one of the legs of the mounting portion is positioned on the first side of the holder, and the other of the legs is positioned on the second side of the holder.

13. The system of claim 12, wherein the at least one die pin comprises a die repair assembly, the die repair assembly including a die repair pin having a head portion and an end portion, a compression spring, and an end cap.

14. The system of claim 13, wherein the head portion of the die repair pin protrudes from one side of the holder and the end portion protrudes from the opposite side of the holder.

15. The system of claim 14, wherein the die repair pin further comprises a collar portion around which the receiving portion of one leg of the mounting portion of the die surrounds, and the pin receiving portion of the other leg surrounds the end cap, wherein the die repair assembly is affixed to the holder.

16. A die storing and organizing system comprising:
a holder for storing and organizing crimp dies, the holder having a first side and a second, opposite side; and
at least one die pin formed as an integral part of the holder as a one piece member, wherein the at least one die pin comprises a first section protruding outward from the first side and a second section protruding outward from the second side; wherein the at least one die pin is sized and shaped to receive a die on the first and second sections to hold the die on the holder at the first and second sides; and wherein at least one crimp die is positioned on at least one die pin.

17. The system of claim 16, wherein the holder is a substantially flat, elongated plate.

18. The system of claim 17, wherein the die includes a crimping portion and a mounting portion, wherein the mounting portion includes two spaced apart legs, each leg having a pin receiving portion bound by inward snap projections.

19. The system of claim 18, wherein one of the legs of the mounting portion is positioned on the first side of the holder, and the other of the legs is positioned on the second side of the holder.

20. A method for storing and organizing dies comprising the steps of:
providing a holder for storing and organizing crimp dies, the holder having a first side and a second, opposite side, where a plurality of apertures are located in the holder, each aperture extending from the first side to the second, opposite side, wherein each aperture is adapted to receive a die pin;
inserting a die pin through an aperture so that the die pin protrudes outward from the first side and the second side; and
positioning a die on the die pin.

21. The method of claim 20, wherein the positioning step includes positioning a die including a crimping portion and a mounting portion, wherein the mounting portion includes two spaced apart legs, each leg having a pin receiving portion bound by inward snap projections.

22. The method of claim 21, wherein one of the legs of the mounting portion is positioned on the first side of the holder, and the other of the legs is positioned on the second side of the holder.

23. The method of claim 22, wherein the die pin comprises a die repair assembly, the die repair assembly including a die repair pin having a head portion and an end portion, a compression spring, and an end cap.

24. The method of claim 23, wherein the head portion of the die repair pin protrudes from one side of the holder and the end portion protrudes from the opposite side of the holder.

25. The method of claim 24, wherein the die repair pin further comprises a collar portion around which the receiving portion of one leg of the mounting portion of the die surrounds, and the pin receiving portion of the other leg surrounds the end cap, wherein the die repair assembly is affixed to the holder.

* * * * *

UNITED STATES PATENT AND TRADEMARK OFFICE
CERTIFICATE OF CORRECTION

| | | |
|---|---|---|
| PATENT NO. | : 7,458,462 B2 | Page 1 of 1 |
| APPLICATION NO. | : 10/771939 | |
| DATED | : December 2, 2008 | |
| INVENTOR(S) | : Carr | |

It is certified that error appears in the above-identified patent and that said Letters Patent is hereby corrected as shown below:

Claim 9, Column 4, line 56 delete "sides" and replace with --side;--

Signed and Sealed this

Twenty-eighth Day of April, 2009

JOHN DOLL
*Acting Director of the United States Patent and Trademark Office*